(12) United States Patent
Li et al.

(10) Patent No.: US 9,424,108 B2
(45) Date of Patent: *Aug. 23, 2016

(54) LAUNCHING AND MANAGING UNATTENDED APPLICATION PROGRAMS

(71) Applicant: International Business Machines Corporation, Armonk, NY (US)

(72) Inventors: Yong L. Li, Beijing (CN); Alan T Yaung, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/315,071

(22) Filed: Jun. 25, 2014

(65) Prior Publication Data

US 2015/0121398 A1  Apr. 30, 2015

Related U.S. Application Data

(63) Continuation of application No. 14/065,062, filed on Oct. 28, 2013.

(51) Int. Cl.
| G06F 3/00 | (2006.01) |
| G06F 9/44 | (2006.01) |
| G06F 9/46 | (2006.01) |
| G06F 13/00 | (2006.01) |
| G06F 9/54 | (2006.01) |
| G06F 9/48 | (2006.01) |

(52) U.S. Cl.
CPC .............. G06F 9/542 (2013.01); G06F 9/485 (2013.01)

(58) Field of Classification Search
CPC ........................................... G06F 9/542
USPC ........................................... 719/318
See application file for complete search history.

(56) References Cited

U.S. PATENT DOCUMENTS

| 7,318,147 | B2 | 1/2008 | Grandais |
| 7,849,457 | B1 | 12/2010 | Pulido |
| 7,965,677 | B2 | 6/2011 | Rivas et al. |
| 8,327,347 | B1 | 12/2012 | Feeser et al. |
| 8,424,077 | B2 | 4/2013 | Adams et al. |
| 2004/0083388 | A1 | 4/2004 | Nguyen |
| 2008/0189708 | A1* | 8/2008 | Cheng et al. ............ 718/102 |
| 2010/0318969 | A1 | 12/2010 | Petrovicky et al. |
| 2011/0093937 | A1 | 4/2011 | Mantle et al. |
| 2012/0042286 | A1 | 2/2012 | Sullivan et al. |
| 2013/0061251 | A1* | 3/2013 | Schwartz et al. ............ 719/320 |

OTHER PUBLICATIONS

Yang et al.; "LiveWeb: A SensorWeb Portal for Sensory The World in Real-Time", dated Oct. 2011, Tsinghua Science and Technology, vol. 16, pp. 491-504.

(Continued)

*Primary Examiner* — Timothy A Mudrick
(74) *Attorney, Agent, or Firm* — Janaki K. Davda; Konrad, Raynes, Davda and Victor LLP

(57) ABSTRACT

Provided are techniques for launching and managing an unattended application program. The application program is launched in background mode. In response to determining that an exit command has been received, an exit command indicator is set to indicate that the exit command has been received and a notification is sent to wake up a blocked main thread of the launched application program.

7 Claims, 8 Drawing Sheets

(56) References Cited

OTHER PUBLICATIONS ip.com et al.; "A New Android Low Memory Killer Adapted for "User Behavior Analytics", and "Effort to Restart" As Well As User", dated Jul. 17, 2010, IPCOM000219806D, Total 6 pp.

US Patent Application, dated Oct. 28, 2013, for U.S. Appl. No. 14/065,062, filed Oct. 28, 2013, entitled, "Launching and Managing Unattended Application Programs", invented by Yong L. Li et al. total 27 pages.

Preliminary Amendment, dated Jun. 25, 2014, for U.S. Appl. No. 14/065,062, filed Oct. 28, 2013, entitled, "Launching and Managing Unattended Application Programs", invented by Yong L. Li et al. total 5 pages.

Office Action, dated Mar. 25, 2015, for U.S. Appl. No. 14/065,062, filed Oct. 28, 2013, invented by Yong L. Li et al., Total 18 pages.

Response to Office Action, dated Jun. 22, 2015, for U.S. Appl. No. 14/065,062, filed Oct. 28, 2013, invented by Yong L. Li et al., Total 8 pages.

Final Office Action, dated Jul. 1, 2015, for U.S. Appl. No. 14/065,062, filed Oct. 28, 2013, invented by Yong L. Li et al., Total 18 pages.

Response to Final Office Action, dated Sep. 30, 2015, for U.S. Appl. No. 14/065,062, filed Oct. 28, 2013, invented by Yong L. Li et al., Total 9 pages.

Office Action, dated Oct. 30, 2015, for U.S. Appl. No. 14/065,062, filed Oct. 28, 2013, invented by Yong L. Li et al., Total 20 pages.

Response to Final Office Action, dated Feb. 24, 20/16, for U.S. Appl. No. 14/065,062, filed Oct. 28, 2013, invented by Yong L. Li et al., Total 23 pages.

Notice of Allowance dated May 3, 2016, for U.S. Appl. No. 14/065,062 (54.111) filed Oct. 28, 2013, invented by Yong L. Li et al., Total 9 pages.

\* cited by examiner

US 9,424,108 B2

LAUNCHING AND MANAGING UNATTENDED APPLICATION PROGRAMS

FIELD

Embodiments of the invention relate to launching and managing unattended application programs, such as content management application programs.

BACKGROUND

Custom content management application programs may be described as storing and managing various types of digitized content, such as document images, electronic office documents, eXtensible Markup Language (XML) documents, audio, and video that are related to a business processes of a commercial organization or an institution. The content management application programs may be short-running application programs or long-running application programs. Conventional systems implement custom content management application programs as a Windows® service or a UNIX® daemon. (Windows is a registered trademark of Microsoft Corporation in the United States and/or other countries. UNIX is a registered trademark of The Open Group in the United States and/or other countries.) However, with such implementations, on-demand execution in background mode is required, and execution at boot time is not suitable. Also, with such implementations, additional C programming may be needed for writing a Windows® service or a UNIX® daemon.

Furthermore, typical background mode processing in UNIX® commands (e.g., "&" and "nohup") terminate the background process after the user logs off from the foreground console session.

SUMMARY

Provided is a method for launching and managing an unattended application program. The application program is launched in background mode. In response to determining that an exit command has been received, an exit command indicator is set to indicate that the exit command has been received and a notification is sent to wake up a blocked main thread of the launched application program.

Provided is a computer program product for launching and managing an unattended application program. The computer program product comprises a computer readable storage medium having program code embodied therewith, the program code executable by at least one processor to perform: launching an application program in background mode; and, in response to determining that an exit command has been received, setting an exit command indicator to indicate that the exit command has been received; and sending a notification to wake up a blocked main thread of the launched application program.

Provided is a computer system for launching and managing an unattended application program. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations, the operations comprising: launching an application program in background mode; and, in response to determining that an exit command has been received, setting an exit command indicator to indicate that the exit command has been received; and sending a notification to wake up a blocked main thread of the launched application program.

BRIEF DESCRIPTION OF THE SEVERAL VIEWS OF THE DRAWINGS

In the drawings, like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
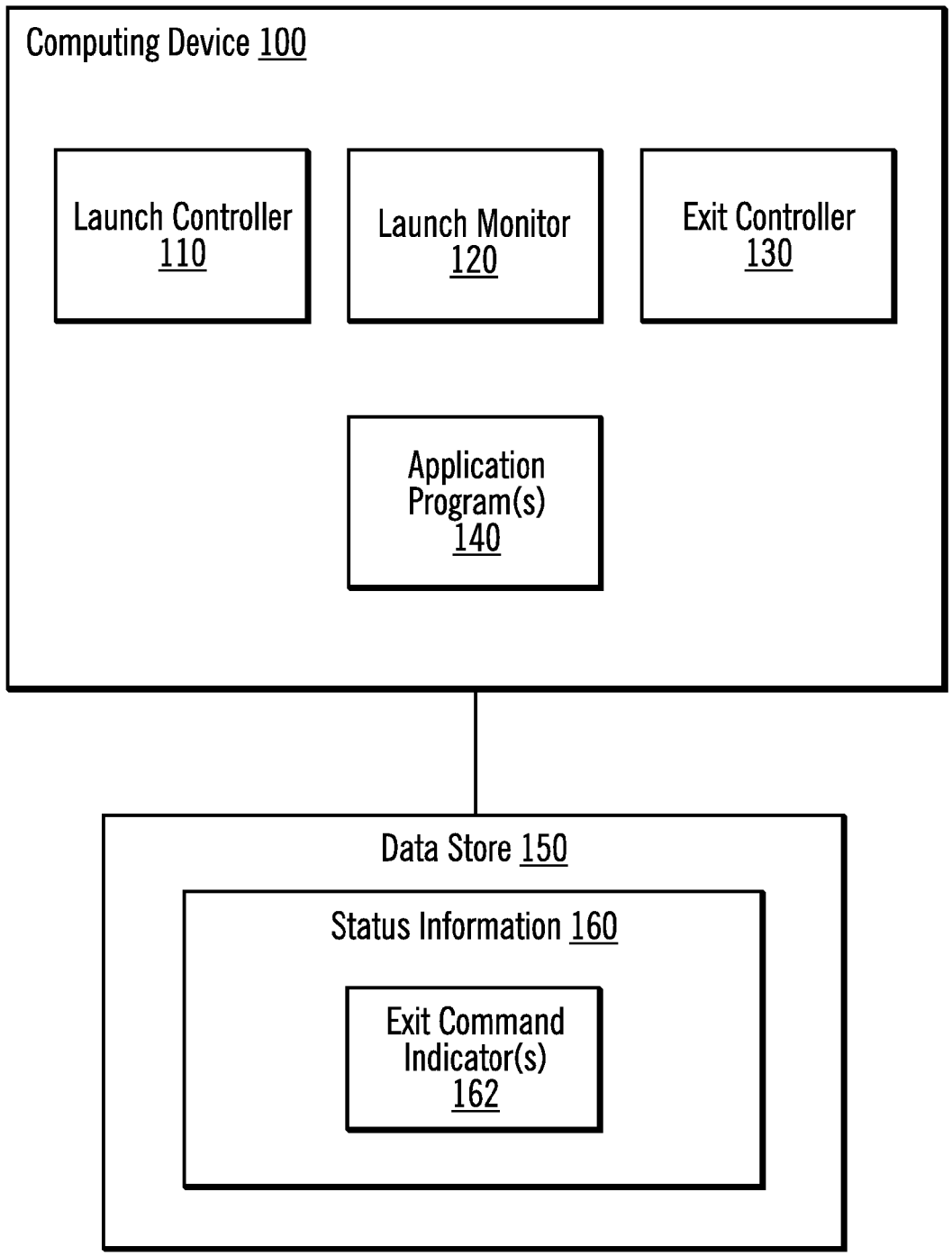
FIG. 1 illustrates, in a block diagram, a computing environment in accordance with certain embodiments.

FIG. 1 illustrates, in a block diagram, a computing environment in accordance with certain embodiments. A computing device 100 includes a launch controller 110, a launch monitor 120, an exit controller 130, and one or more application programs 140. The computing device 100 is coupled to a data store 150. The data store 150 stores identifying information and status information 160 for each of the one or more application programs 140. In certain embodiments the status information includes an exit command indicator 162 for each launched application program 140.

In certain embodiments, the exit command indicator 162 (e.g., a flag or a bit) is set to true to indicate that the exit command has been received and that the launched application program is to be terminated or set to false to indicate that the exit command has not been received and that the launched application program is not to be terminated. In certain embodiments, in response to a user issuing an exit command to terminate a launched application program, the exit controller 130 sets the exit command indicator 162 for the launched application program to true to indicate that the exit command has been received.

In certain embodiments, the one or more application programs 140 include at least one custom content management application program. In certain embodiments, the one or more application programs 140 include at least one Java® application program. (Java is a registered trademark of Oracle Corporation in the United States and/or other countries). In certain embodiments, the data store 150 is a persistent data store. A persistent data store may be described as a storage that saves the data in persistence. In certain embodiments, Java® Preferences Application Programming Interface (API) is utilized as the persistent data store. The Java® Preferences API saves the data in a Windows® registry on Windows® platforms and saves the data in the user directory on UNIX® platforms.

Embodiments provide a way to run application programs (e.g., custom content management application programs) in the background mode (unattended mode). Running the application programs in the background mode may be described as running without human attention. Furthermore, the application program continues to run in background mode even when the login user is logged off from a terminal session on a UNIX® platform or the user exits from a command console on a Windows® platform. On the contrary, in foreground mode, the application program will be terminated after the login user is logged off from a terminal session on a UNIX® platform or the user exits from a command console on a Windows® platform.

Embodiments provide a technique for managing unattended application programs. Embodiments allow unattended application programs to be launched and managed in background mode. Embodiments provide:

(1) an enablement kit that enables the unattended background processing of an application program; and (2) a set of utility tools which manage the launch, termination and status tracking of application programs in background mode.

Figure 2:
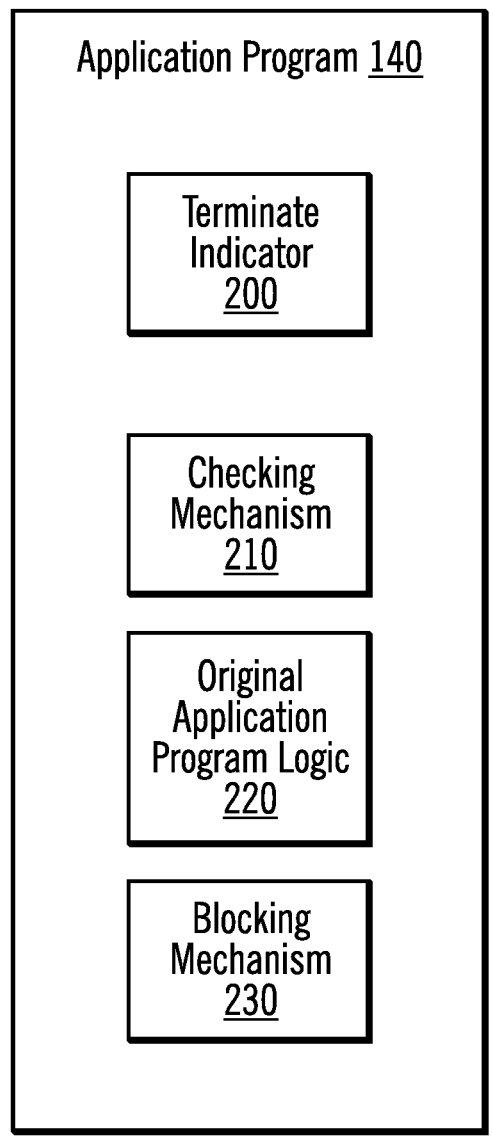
FIG. 2 illustrates, in a block diagram, an application program in accordance with certain embodiments.

FIG. 2 illustrates, in a block diagram, an application program 140 in accordance with certain embodiments. The application program 140 includes a terminate indicator 200, which is a global variable. The terminate indicator 200 may be accessed by the checking mechanism 210 and by the blocking mechanism 230. In certain embodiments, the terminate indicator 200 is set to true to indicate that an exit command has been received and set to false to indicate that an exit command has not been received.

To enable the unattended mode, the application program 140 incorporates the checking mechanism 210 before the original application program logic 220 and incorporates the blocking mechanism 230 after the original application program logic 220. This avoids the need for additional C programming and shell scripting. In certain embodiments, this is a Java® implementation that also enhances the portability with various platforms and maintainability of the application program. In certain embodiments, even though blocks 210, 220, and 230 may be invoked sequentially in the application program, they will run as separate execution threads after they are started.

The enablement kit includes an implementation (e.g., a Java® implementation) of the following elements:

The checking mechanism 210 for checking an exit command indicator 162 stored in the data store 150 to determine whether an exit command has been received by the exit controller 130. Once the exit command has been received, the checking mechanism 210 sets a terminate indicator 200 (e.g., a flag or a bit) to indicate the receipt of the exit command. Then, a notification is sent to wake up a blocked main thread of a launched application program.

The blocking mechanism 230 for blocking a main thread of a launched application program if the terminate indicator 200 is set to indicate that an exit command has not been received. When a notification is received to wake up the thread, the blocking mechanism 230 terminates the launched application program if the terminate indicator 200 is set to indicate that an exit command has been received.

The data store 150 for storing the identifier information (e.g., a process Identifier (ID)) of each launched application program and additional status information.

In certain embodiments, the launched application program is a main thread, the checking mechanism 210 is a sub-thread of the main thread, the original application program logic 220 is another sub-thread of the main thread, and the blocking mechanism 230 is a routine of the main thread of the original application program logic 220.

The following utility tools support the launch, termination, and status checking of the application programs running in background mode:

Launch controller 110 is a utility that launches an application program (which incorporates the checking mechanism 210 and the blocking mechanism 230). After the application program is launched, the application program runs in background mode.

Launch monitor 120 is a utility that provides status tracking capability by displaying in a Graphical User Interface (GUI) the process IDs of launched application programs and possibly additional information. such as user ID of a user who launched the application program, a start time of when the application program was launched, etc.

Exit controller 130 is a utility that terminates the application program that is launched through the launch controller 110.

Figure 3:
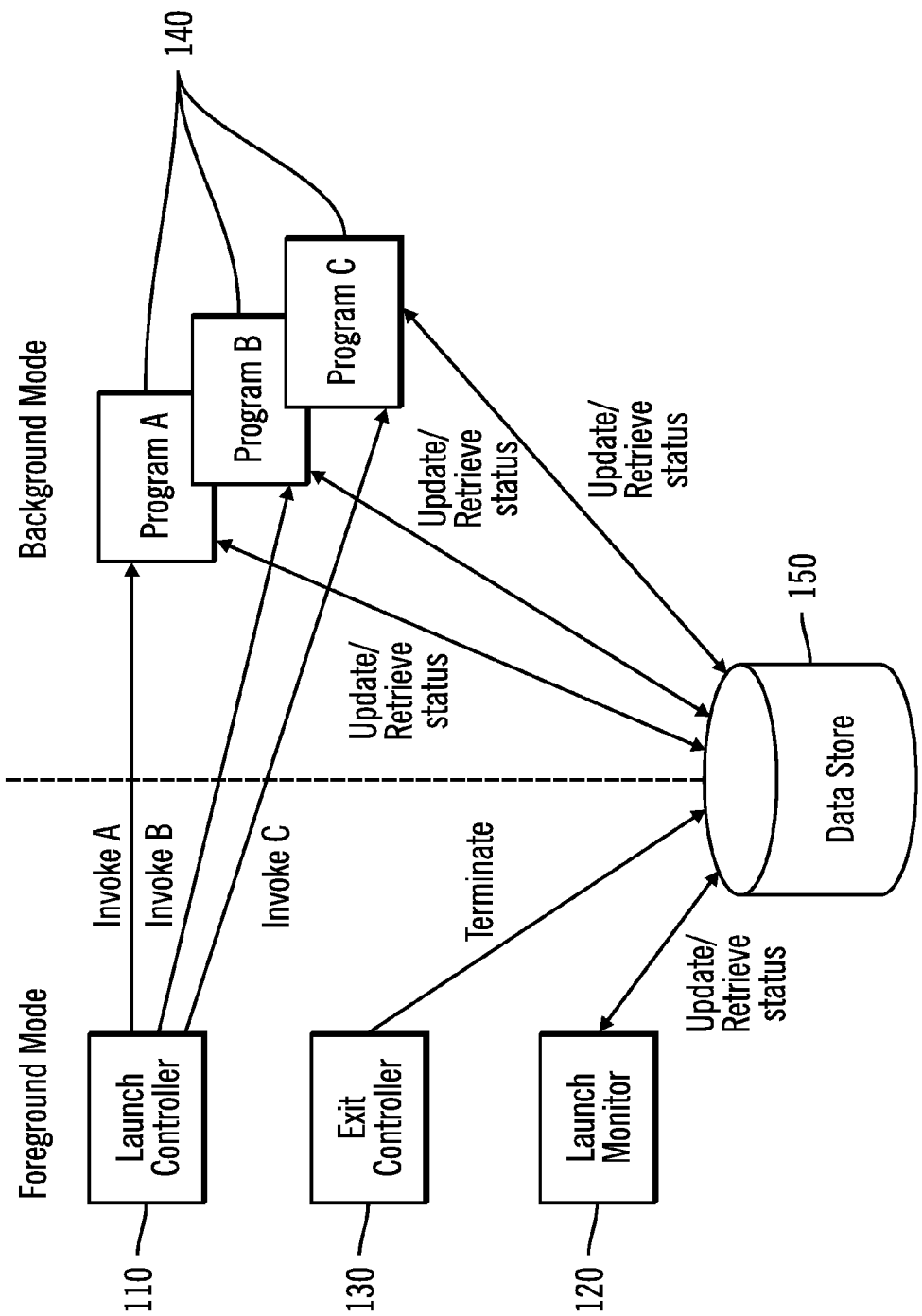
FIG. 3 illustrates an overview of foreground mode and background mode processing in accordance with certain embodiments.

FIG. 3 illustrates an overview of foreground and background processing in accordance with certain embodiments. In FIG. 3, the launch controller 110, the launch monitor 120, and the exit controller 130 run in the foreground, while the application programs A, B, and C 140 run in the background.

In FIG. 3, from the launch controller 110, a user may launch application programs A, B, and C 140, which run in background mode. In various embodiments, a user may be a human user, a computer program, a device, etc. Application programs A, B, and C 140 store the process ID and additional status in the data store 150. Application programs A, B, and C 140 may also retrieve the process ID and additional status from the data store 150. Even when the user logs off from the current console session, the application programs A, B, and C 140 continue to run in background mode.

From the exit controller 130, the user may terminate a specific application program 140 that is running in background mode. The exit controller 130 updates the exit command indicator 162 for the terminated application program 140 in the data store 150. In this manner, an exit command is sent to the data store 150 for the terminated application program. When the application program detects the arrival of an exit command in the data store 150 (via the checking mechanism 210), the application program will exit from the execution (i.e., terminate). In addition, the launch monitor 120 may be used to update and retrieve the status of launched application programs.

Figure 4:
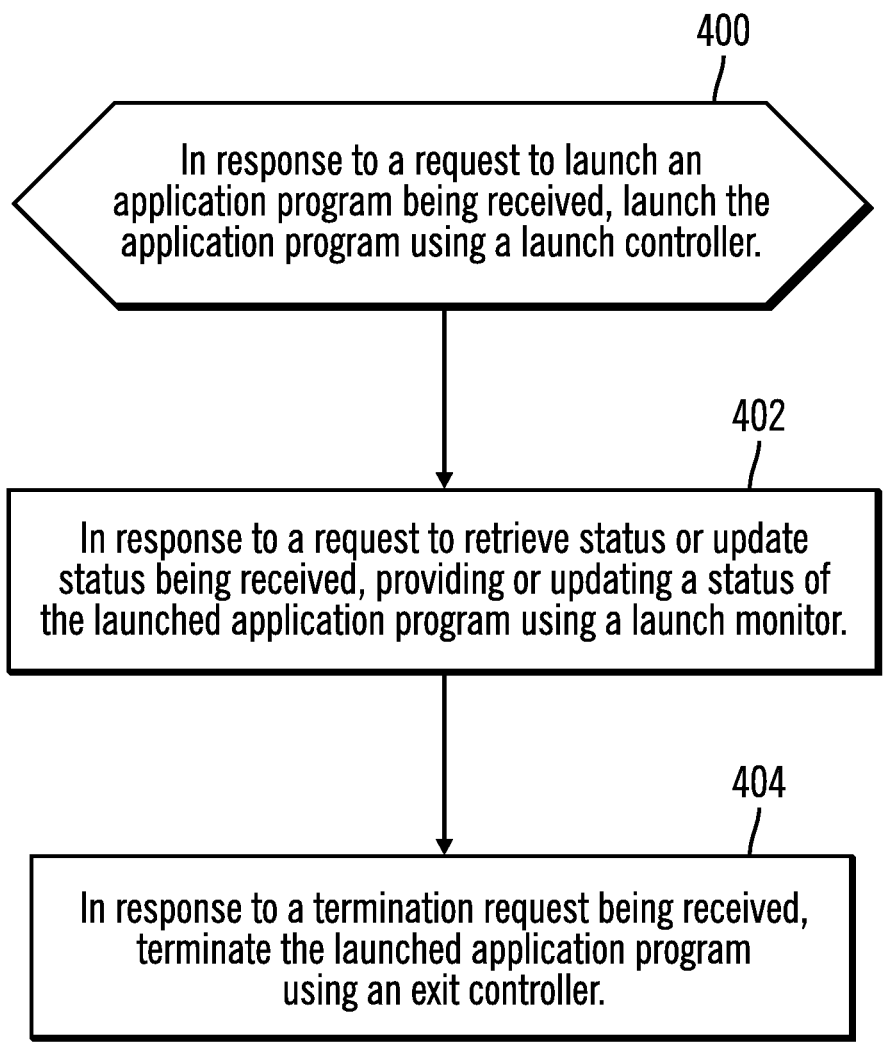
FIG. 4 illustrates, in a flow diagram, operations for using utilities in accordance with certain embodiments.

FIG. 4 illustrates, in a flow diagram, operations for using the utilities in accordance with certain embodiments. Control beings at block 400 with, in response to receiving a request to launch an application program, the application program being launched using a launch controller 110. In block 402, in response to a request to retrieve status or update status being received, providing or updating a status of the launched application program using a launch monitor 120. In block 404, in response to a termination request being received, terminating the launched application program using an exit controller 130.

Figure 5A:
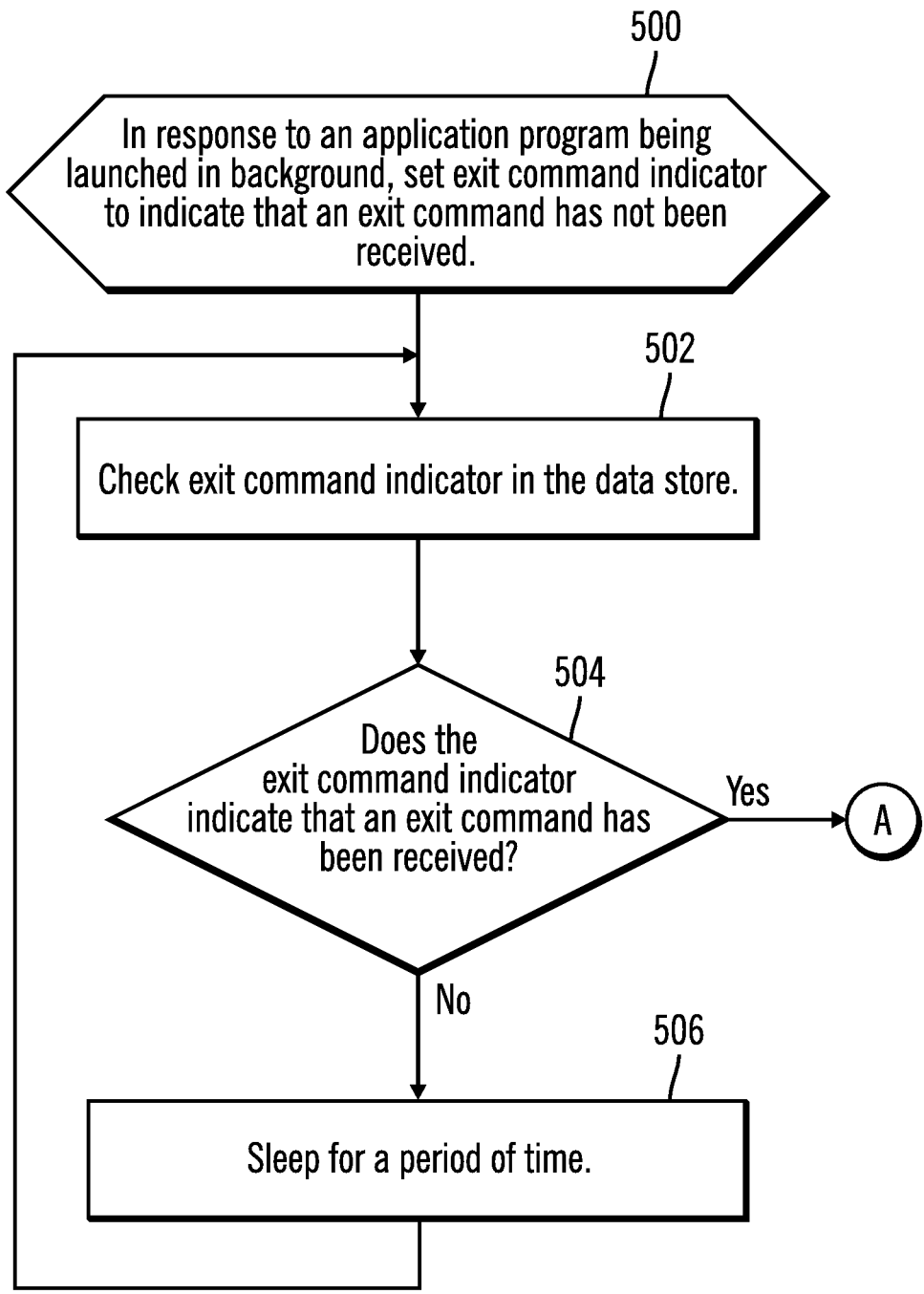
FIGS. 5A and 5B illustrate, in a flow diagram, operations for checking an exit command indicator and setting a terminate indicator in accordance with certain embodiments.
Figure 5B:
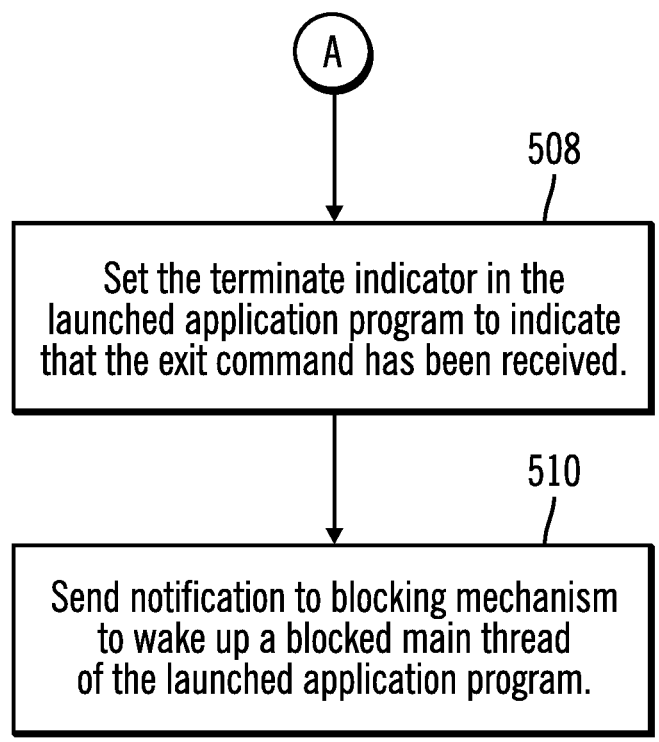

FIGS. 5A and 5B illustrate, in a flow diagram, operations for checking an exit command indicator and setting a terminate indicator in accordance with certain embodiments. Control begins at block 500 with the exit controller 130, in response to an application program 140 being launched in background mode, setting an exit command indicator 162 to indicate that an exit command has not been received (e.g., setting the exit command indicator 162 to false). In block 502, the checking mechanism 210 checks the exit command indicator 162 in the data store 150. In block 504, the checking mechanism 210 determines whether the exit command indicator indicates that an exit command has been received. If so, processing continues to block 508 (FIG. 5B), otherwise, processing continues to block 506.

In block 506, the checking mechanism 210 sleeps for a period of time (e.g., set by the user launching the application program or set by a system administrator). When the checking mechanism 210 wakes up, processing continues to block 502.

In block 508, the checking mechanism 210 sets the terminate indicator 200 in the launched application program to indicate that the exit command has been received for the launched application program (e.g., sets the terminate indicator 200 to true). In block 510, the checking mechanism 210 sends a notification to the blocking mechanism 230 to wake up a blocked main thread of the launched application program.

Figure 6:
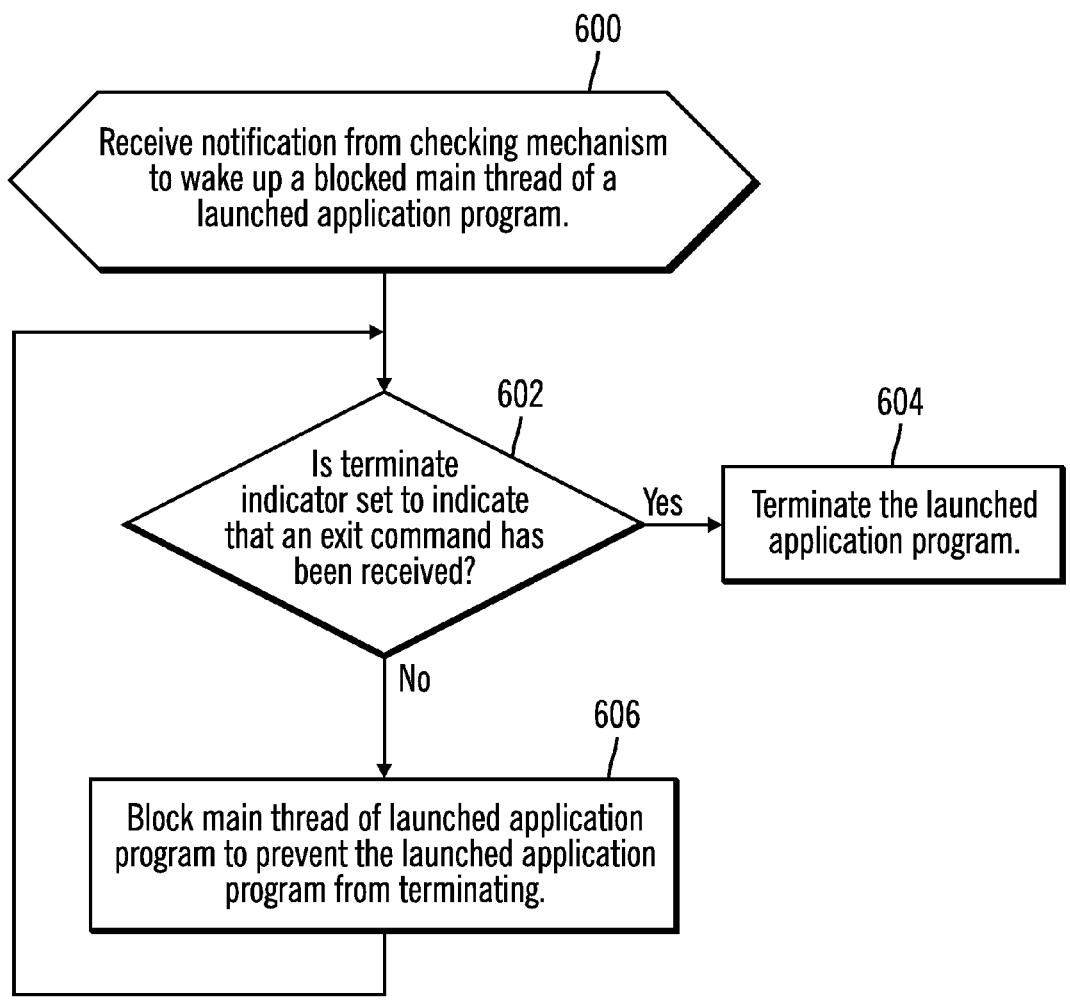
FIG. 6 illustrates, in a flow diagram, operations performed by a blocking mechanism in accordance with certain embodiments.

FIG. 6 illustrates, in a flow diagram, operations performed by the blocking mechanism 230 in accordance with certain embodiments. Control begins at block 600 with the blocking mechanism 230 receiving a notification from the checking mechanism 210 to wake up a blocked main thread of a launched application program. In block 602, the blocking mechanism 230 determines whether the terminate indicator 200 is set to indicate that an exit command has been received for the launched application program (e.g., whether the terminate indicator 200 is set to true). In block 604, the blocking mechanism terminates the launched application program. In block 606, the blocking mechanism blocks the main thread of the launched application program to prevent the launched application program from terminating. In certain embodiments, the wait and notify features in Java® threading are used to handle the blocking and notification in a Java® thread.

Thus, with embodiments, long-running application programs may be launched in background mode and will run until actively terminated. Also, on-demand execution is available as the application program may be launched in background mode and terminated at any time by a user.

In order to address the requirement for unattended content management application programs, embodiments enable the launch and management of unattended content management application programs in background mode.

Thus, embodiments provide a new type of background processing to be addressed which is different from the traditional ways of handling background processing in Unix® platforms and Windows® platforms.

Embodiments provide a new approach supporting on-demand execution of an application program in the background (i.e., an unattended mode) without the complexity and overhead of additional programming or shell scripting.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flow diagram (e.g., flowchart) illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowcharts illustration, and combinations of blocks in the block diagrams and/or flowcharts illustration, can be implemented by special purpose hardware-based systems that perform the specified functions or acts, or combinations of special purpose hardware and computer instructions.

In addition, the illustrated operations of the flow diagrams and block diagrams show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Figure 7:
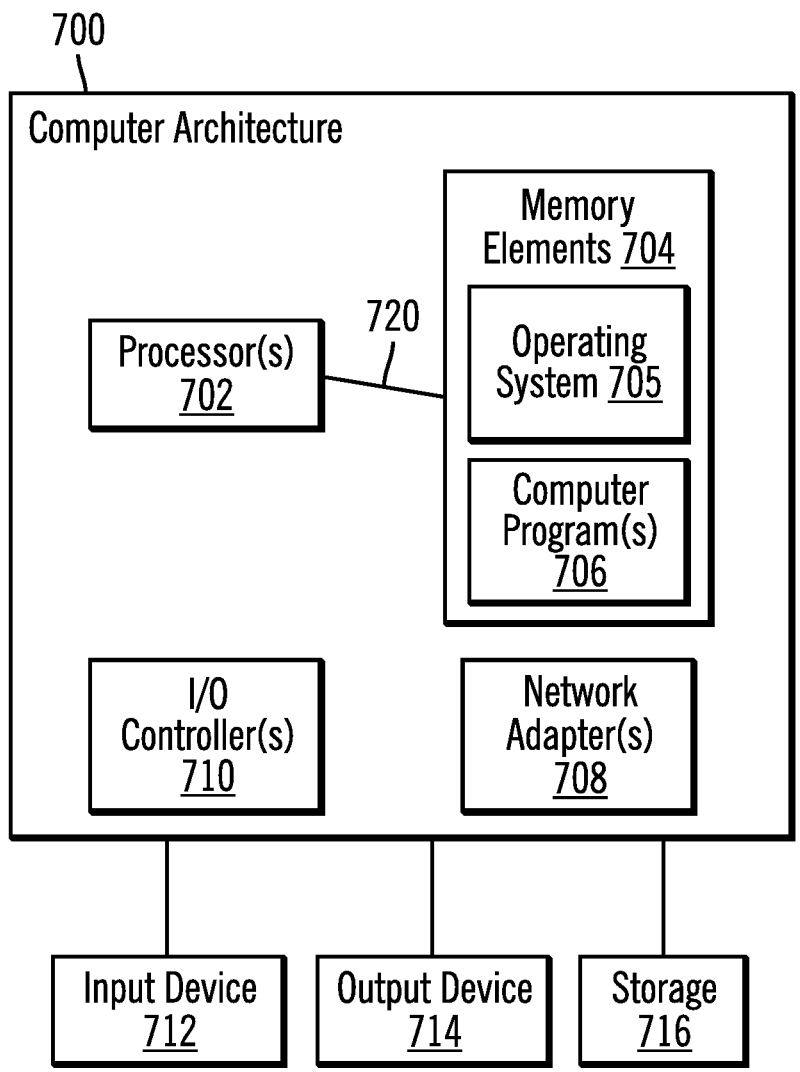
FIG. 7 illustrates, in a block diagram, a computer architecture that may be used in accordance with certain embodiments.

FIG. 7 illustrates a computer architecture 700 that may be used in accordance with certain embodiments. In certain embodiments, computing device 100 may implement computer architecture 700. The computer architecture 700 is suitable for storing and/or executing program code and includes at least one processor 702 coupled directly or indirectly to memory elements 704 through a system bus 720. The memory elements 704 may include local memory employed during actual execution of the program code, bulk storage, and cache memories which provide temporary storage of at least some program code in order to reduce the number of times code must be retrieved from bulk storage during execution. The memory elements 704 include an operating system 705 and one or more computer programs 706.

Input/Output (I/O) devices 712, 714 (including but not limited to keyboards, displays, pointing devices, etc.) may be coupled to the system either directly or through intervening I/O controllers 710.

Network adapters 708 may also be coupled to the system to enable the data processing system to become coupled to other data processing systems or remote printers or storage devices through intervening private or public networks. Modems, cable modem and Ethernet cards are just a few of the currently available types of network adapters 708.

The computer architecture 700 may be coupled to storage 716 (e.g., any type of storage device; a non-volatile storage area, such as magnetic disk drives, optical disk drives, a tape drive, etc.). The storage 716 may comprise an internal storage device or an attached or network accessible storage. Computer programs 706 in storage 716 may be loaded into the memory elements 704 and executed by a processor 702 in a manner known in the art.

The computer architecture 700 may include fewer components than illustrated, additional components not illustrated herein, or some combination of the components illustrated and additional components. The computer architecture 700 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

What is claimed is:

1. A method, comprising:
   in response to an application program being launched in background mode at a start time,
   monitoring an exit command indicator in a data store to determine whether an exit command has been received;
   in response to determining that the exit command indicator indicates that the exit command has been received, setting a terminate indicator to indicate that the application program is to be terminated; and
   in response to the setting of the terminate indicator, terminating the launched application program.

2. The method of claim 1, wherein the launched application program comprises a checking mechanism and a blocking mechanism.

3. The method of claim 2, wherein the checking mechanism, in response to the setting of the terminate indicator, sends a notification to wake up a blocked main thread of the launched application program.

4. The method of claim 3, wherein the blocking mechanism receives the notification and wakes up the blocked main thread of the launched application program.

5. The method of claim 4, wherein the blocking mechanism, in response to determining that the terminate indicator has not been set, blocks the main thread of the launched application program.

6. The method of claim 2, wherein the monitoring is performed by the checking mechanism.

7. The method of claim 1, wherein the application program is launched and terminated on-demand.

* * * * *